Patented June 28, 1927.

1,634,100

UNITED STATES PATENT OFFICE.

HERBERT WILLIAM GEPP, HARRY HEY, AND GILBERT RIGG, OF MELBOURNE, VICTORIA, AND ROYALE HILLMAN STEVENS AND ROWLAND THOMAS DRYLL WILLIAMS, OF RISDON, HOBART, TASMANIA, AUSTRALIA, ASSIGNORS TO ELECTROLYTIC ZINC COMPANY OF AUSTRALASIA LIMITED, OF MELBOURNE, VICTORIA, AUSTRALIA.

TREATMENT OF ZINC-BEARING ORES AND METALLURGICAL PRODUCTS.

No Drawing. Application filed July 30, 1923, Serial No. 654,775, and in Australia August 1, 1922.

This invention relates to the treatment of zinc bearing ores and metallurgical products and is herein illustrated as applied to the treatment of residues or products from hydrometallurgical operations wherein the zinc is obtained from said residues or products in the form of a solution (e. g. as zinc sulphate). From this solution the zinc may be either recovered in metallic form by electrodeposition or other products containing zinc compounds may be formed, such as lithopone.

In the hydrometallurgical treatment of zinc bearing sulphide ores as hitherto practised, it has been customary to subject the said ores to a roasting operation and then to leaching with dilute sulphuric acid (or spent electrolyte) to dissolve out the zinc oxide as zinc sulphate. This leaching, however, leaves a portion of the zinc (mainly the ferrite) undissolved. The resultant zinc sulphate solution is separated from the solid matter and subsequently submitted to purification by known means before passing to the electrolytic cells or for the preparation of lithopone.

In the hydrometallurgical treatment of zinc bearing ores as above indicated, a certain proportion of the zinc present is in an insoluble form, such as zinc ferrite (which is insoluble in water or cold dilute sulphuric acid). In some cases this ferrite is produced as a result of the furnacing operation and in some cases it is ferrite naturally occurring in the ore, and this insoluble zinc is not available for subsequent treatment, such as for the electrolytic recovery of zinc or for the manufacture of lithopone.

Now, the object of this invention is to provide an improved method of treatment of zinc-bearing ores, residues, and other products whereby zinc in an insoluble form, such as zinc ferrite (insoluble in water or cold dilute sulphuric acid) is converted to a soluble condition.

Though this invention is herein described as being applicable more especially to residues obtained from hydrometallurgical treatment as above set out, it will be understood that it is not confined thereto, but is equally applicable to other ores or metallurgical products in which the zinc occurs in an insoluble form and is not amenable to the usual known methods of treatment and that the term "ores" in this specification will include such zinc-bearing materials to which the process is applicable.

We accomplish the object of this invention by providing a method of treatment which consists of mixing the said zinc bearing ores, residues and other products, with sulphuric acid, and then subjecting the mixture to a heating or furnacing operation in the presence of gases containing sulphur dioxide such as roaster gases.

In carrying out this invention, the zinc-bearing materials are first mixed with a certain amount of sulphuric acid which is determined by the character of the material and the nature of the subsequent operation. Thus, in applying the invention to the treatment of residues from a previous hydrometallurgical operation in which the zinc is present mostly as ferrite, we have found that the amount of sulphuric acid required is very little in excess of that theoretically necessary for the sulphating of the insoluble zinc present, and that it is not necessary to have sufficient acid for the sulphating of the iron present as well, as any sulphate of iron formed is converted to ferric oxide in the subsequent operation, liberating $SO_2$ and $SO_3$, which gases are available for decomposing further zinc ferrite.

This mixing operation is performed in such an apparatus as will ensure a complete association of the acid with the material. An apparatus similar in design to a concrete mixer or a rotating drum has been found effective for the purpose.

In carrying out this mixing operation of the material with acid, we have found that nodules can be formed, and that the bringing of the mixture into this condition facilitates the subsequent furnacing operation wherein hot roaster gases are caused to pass through the mixture, as in a shaft furnace.

The material with the requisite amount of acid, which may be added in stages, is maintained in a constant state of movement and thereby is agglomerated into nodules.

The amount of permissible moisture will vary according to the strength of acid to be used, and also with the nature of the material. In the treatment of zinc-bearing residues from the electrolytic method for the recovery of zinc, we have found that, when using 98% acid, good nodules can be formed if the moisture content of the residues is approximately 10%. After the mixture has been maintained in a state of movement for some time, any fines remaining can be agglomerated by the addition of a small amount of water. This water forms a plastic mass with the fines, and this plastic mass subsequently forms nodules by the movement or rolling action of the apparatus. It has been found that the quantity of water added and the manner of its addition has an important bearing on the production of the nodules, but a simple laboratory experiment with any given sample of material will determine the best conditions to apply. In some cases it is desirable that weaker acid be used, and with 60% acid we have found that efficient nodulizing can be obtained if both the acid and the residues aforesaid are first heated to a temperature of about 159° C.

This mixture of the zinc-bearing material and sulphuric acid (preferably in the form of nodules) is then subjected to a heating or furnacing operation in the presence of gases containing sulphur dioxide or roaster gases.

One form of furnace suitable for this operation is in the nature of a shaft furnace which may be fed either continuously or intermittently, the gases containing sulphur dioxide (such as roaster gases) being caused to pass upwardly through the charge of nodules which are of such a size that a free passage of the gases is permitted. These gases are usually hot, but external heat may be applied to maintain the requisite temperature for the conversion of substantially all the zinc present to zinc sulphate. The roaster gases enriched by this sulphating operation are then passed, after suitable scrubbing, to an acid plant for the manufacture of sulphuric acid. If these gases are to be treated in a "contact" plant for the recovery or sulphuric acid, it is preferable that the acid-mixed material should be first dried or heated to about 300° C. before roasting, for the elimination of moisture and objectionable elements such as chlorine and fluorine.

We do not, however, confine ourselves to the use of a shaft furnace. This furnacing operation may be carried out in a rotary kiln, or a roasting furnace, or any other type.

In adapting the invention to the treatment of the residues from a hydrometallurgical treatment, as above suggested, the roaster gases used in the heating or furnacing operation would preferably be those derived from the preliminary roasting necessary for the said hydrometallurgical treatment, the said roaster gases being caused to pass through the furnace in which the said heating or furnacing operation is being conducted before going to an acid plant. This furnacing or heating of the ores or other zinc-bearing material mixed with sulphuric acid and in the presence of roaster gases or sulphur dioxide is carried out preferably at a temperature above the dissociation point of the most refractory sulphate of iron under the conditions of working, but below that of the dissociation point of sulphate of zinc in an atmosphere of gases containing $SO_2$.

In practice we have found that a temperature of about 670° C. well answers the purpose, although good results have been obtained at temperatures ranging from 620° C. to 740° C. The presence of sulphur dioxide added by introduction of roaster gases raises the decomposition temperatures of both the sulphates of iron and of zinc so that these are the usual limits of working the present process.

Sulphate of iron present or formed during the furnacing operation is converted into ferric oxide liberating sulphur dioxide and sulphur trioxide which are available for decomposition of further zinc ferrite and at the same time any excess passes over with roaster gases to the acid plant. In this way, relatively complete conversion of the zinc to sulphate is effected, whilst any excess acid added over that consumed in the sulphating of the zinc is substantially recovered, the iron being left for the most part in insoluble form. The insoluble zinc compounds are thus converted to soluble zinc sulphate, and may be leached out and used for the recovery of zinc by the electrolytic method, or for the manufacture of lithopone, or for any other industrial purpose.

The following is an example of the application of this invention to residues from the leaching of calcined zinc concentrates with spent electrolyte in the electrolytic method for the recovery of zinc.

The residue in question contained 11% moisture and its assay (calculated in dry weights) was as follows:—

Total zinc—19.2% of which 1.2% of the whole was water soluble.

Total iron—29.0%.

Sulphate sulphur—2.5 (mainly as $PbSO4$).

Sulphide sulphur—1.47%.

This material was charged into a rotating drum and an amount of sulphuric acid (98% strength) equivalent to 30% of the weight of dry material was added in stages. Finally, an amount of water equivalent to 0.5% of the weight of the dry material was added and the drum continuously rotated until a relatively small amount of material remained in the form of "fines", nodules being formed. This nodulized product was then dried at a temperature of about 300° C. for one hour. After drying, the product assayed as follows:—

Total zinc—15.6% of which 5.5% of the whole was water soluble.
Total iron—22.1% of which 3.8% of the whole was water soluble.
Sulphate sulphur—9.2%.
Sulphide sulphur—1.02%.

The dried product was then charged into a small shaft furnace and gradually moved down through the same. Hot roaster gases containing 5% to 5½% $SO_2$ were introduced into the bottom of the furnace and passed upwards through the nodules and discharged at the top of the furnace. During their passage through the furnace the nodules gradually attained a temperature of 670° C. The assay of the nodules as discharged from the bottom of the furnace was as follows:—

Total zinc—15.2% of which 12.5% of the whole was water soluble.
Total iron—22.7% of which 1.1% of the whole was water soluble.
Sulphate sulphur—10.38%.
Sulphide sulphur—0.12%.

It will thus be seen that 82% of the zinc contained in the final product was water soluble and that a relatively small proportion of the iron was soluble in water.

From experiments which we have made it would appear that the amount of sulphide sulphur present in an ore governs the amount of acid required to be added. For example, in treating residues of the same description containing 3.5% sulphide sulphur, the amount of acid required to be added to the material prior to the nodulizing to obtain a final product containing 80% of the zinc present in soluble form was 35% of the dry weight of the charge, instead of 30% as in the above example.

We claim:—

1. A method for the treatment of zinc-bearing ores which comprises mixing the said ores with sulphuric acid and subjecting said mixture to a furnacing operation wherein hot gas containing a substantial amount of sulphur dioxide from an external source is brought into contact with the mixture.

2. A method for the treatment of zinc-bearing ores which comprises mixing said ores with sulphuric acid, subjecting the mixture to an operation for the formation of nodules, subjecting said nodules to a furnacing operation wherein hot roaster gases containing sulphur dioxide are brought into contact with the nodules, passing the residual gases from the furnacing operation to a plant for the manufacture of sulphuric acid, and recovering a zinc product from the treated ore.

3. A method for the treatment of zinc-bearing ores which consists in mixing the said ores with sulphuric acid and then subjecting the mixture to a furnacing operation in the presence of gas containing a substantial amount of sulphur dioxide from an external source at such a temperature that the sulphate of iron is dissociated but the sulphate of zinc is not dissociated.

4. A method for the treatment of zinc-bearing ores which consists in mixing the said ores with sulphuric acid, treating said mixture with hot gas containing a substantial amount of sulphur dioxide from an external source at such a temperature that the sulphate of iron is dissociated but the sulphate of zinc is not dissociated thereby rendering zinc present in the ore soluble, and passing the residual gas to a plant for the manufacture of sulphuric acid.

5. A method for the treatment of zinc-bearing ores which consists in mixing the said ores with an amount of sulphuric acid slightly in excess of that required for the conversion of the zinc present into zinc sulphate, and then subjecting the mixture to a furnacing operation in the presence of gas containing a substantial amount of sulphur dioxide from an external source at such a temperature that the sulphate of iron is dissociated but the sulphate of zinc is not dissociated.

6. A method for the treatment of zinc-bearing ores which consists in mixing the said ores with sulphuric acid, subjecting the mixture to an operation for the formation of nodules, and then subjecting the said nodules to a furnacing operation in the presence of gas containing a substantial amount of sulphur dioxide from an external source at such a temperature that the sulphate of iron is dissociated but the sulphate of zinc is not dissociated.

7. A method for the treatment of zinc-bearing ores which consists in mixing the said ores with sulphuric acid, subjecting the mixture to an operation for the formation of nodules, treating said nodules with hot gas containing a substantial amount of sulphur dioxide from an external source thereby rendering zinc present in the ore soluble and rendering the iron substantially insoluble, and passing the residual gas to a plant for the manufacture of the sulphuric acid.

8. A method for the treatment of zinc-bearing ores which comprises mixing said ores with approximately 30% their weight of 98% sulphuric acid, subjecting the mixture to an operation for the formation of nodules, subjecting the nodules to a furnacing operation wherein hot gas containing a substantial amount of sulphur dioxide from an external source is brought into contact with the nodules, and recovering zinc in a soluble form from said treated nodules.

9. A method for the treatment of zinc-bearing ores which consists in mixing the said ores with sulphuric acid, and treating said mixture with hot gas containing a substantial amount of sulphur dioxide from an external source at a temperature of approximately 670° C. thereby rendering the zinc present in the ore soluble and rendering the iron substantially insoluble.

10. A method for the treatment of zinc-bearing ores which consists in drying the said ores to reduce the moisture content, then adding sulphuric acid and water whilst being maintained in a constant state of movement for the formation of nodules, drying the said nodules, and then subjecting them to a furnacing operation in the presence of gas containing a substantial amount of sulphur dioxide from an external source at such a temperature that the sulphate of iron is dissociated but the sulphate of zinc is not dissociated.

11. A method for the treatment of zinc-bearing ores which consists in mixing the said ores with sulphuric acid whilst being kept in a constant state of movement for the formation of nodules, charging the said nodules into the top of a shaft furnace and causing the said nodules to pass gradually downward through the said shaft furnace wherein they are treated by hot gas containing a substantial amount of sulphur dioxide from an external source caused to pass upwards through the said nodules in the shaft furnace, and passing the residual gas to a plant for the manufacture of sulphuric acid.

12. A method for the treatment of zinc-bearing ores which comprises mixing said ores with approximately 30% their weight of 98% sulphuric acid, subjecting the mixture to an operation for the formation of nodules, subjecting the nodules to a furnacing operation wherein they are heated to a temperature of from 620° to 740° centigrade and subjected to the action of gas containing a substantial amount of sulphur dioxide from an external source, passing the residual gas to a plant for the manufacture of sulphuric acid, and recovering a zinc product from the treated ore.

13. A method for the treatment of zinc-bearing ores which comprises mixing said ores with approximately 30% their weight of 98% sulphuric acid, subjecting the mixture to an operation for the formation of nodules, subjecting the nodules to a furnacing operation wherein they are heated to a temperature of approximately 670° centigrade and gas containing a substantial amount of sulphur dioxide from an external source is brought into contact with the nodules, passing the residual gas from the furnacing operation to a plant for the manufacture of sulphuric acid, and recovering a zinc product from the treated ore.

In testimony that we claim the foregoing as our invention, we have signed our names to this specification.

HERBERT WILLIAM GEPP.
HARRY HEY.
GILBERT RIGG.
ROYALE HILLMAN STEVENS.
ROWLAND THOMAS DRYLL WILLIAMS.